United States Patent [19]

Buerkle et al.

[11] Patent Number: 5,333,287
[45] Date of Patent: Jul. 26, 1994

[54] SYSTEM FOR EXECUTING MICROINSTRUCTION ROUTINES BY USING HARDWARE TO CALCULATE INITIALIZATION PARAMETERS REQUIRED THEREFORE BASED UPON PROCESSOR STATUS AND CONTROL PARAMETERS

[75] Inventors: Daniel J. Buerkle, Newark Valley; Agnes Y. Ngai, Endwell, both of N.Y.

[73] Assignee: International Business Machines Corporation, Armonk, N.Y.

[21] Appl. No.: 22,791
[22] Filed: Feb. 23, 1993

Related U.S. Application Data

[63] Continuation of Ser. No. 774,131, Oct. 15, 1991, abandoned, which is a continuation of Ser. No. 287,430, Dec. 21, 1988, abandoned.

[51] Int. Cl.⁵ .............................................. G06F 9/28
[52] U.S. Cl. .................................. 395/375; 395/775; 364/262.7; 364/262.8; 364/261.2; 364/DIG. 1
[58] Field of Search ............... 364/200, 900, DIG. 1, 364/DIG. 2; 395/375, 800, 775

[56] References Cited

U.S. PATENT DOCUMENTS

| | | | |
|---|---|---|---|
| 3,736,567 | 5/1973 | Lotan et al. | 395/775 |
| 3,812,470 | 5/1974 | Murtha et al. | 364/200 |
| 3,872,447 | 3/1975 | Tessera et al. | 364/200 |
| 3,949,372 | 4/1976 | Brioschi | 364/200 |
| 3,953,833 | 4/1976 | Shapiro | 364/200 |
| 3,991,404 | 11/1976 | Brioschi et al. | 364/200 |
| 3,997,895 | 12/1976 | Cassonnet et al. | 364/200 |
| 4,001,788 | 1/1977 | Patterson et al. | 364/200 |
| 4,080,648 | 3/1978 | Asano et al. | 364/200 |
| 4,087,854 | 5/1978 | Kinoshita et al. | 364/200 |
| 4,160,289 | 7/1979 | Bambara et al. | 364/200 |
| 4,161,026 | 7/1979 | Wilhite | 364/200 |
| 4,173,041 | 10/1979 | Dvorak et al. | 364/200 |
| 4,179,736 | 12/1979 | Wilhite | 364/200 |
| 4,187,539 | 2/1980 | Eaton | 364/200 |
| 4,197,578 | 4/1980 | Wada et al. | 364/200 |
| 4,237,532 | 12/1980 | Bogerson et al. | 364/200 |
| 4,247,893 | 1/1981 | Anderson et al. | 364/200 |
| 4,305,124 | 12/1981 | Marro et al. | 364/200 |
| 4,307,445 | 12/1981 | Tredennick et al. | 364/200 |
| 4,312,034 | 1/1982 | Gunter et al. | 364/200 |
| 4,323,964 | 4/1982 | Gruner | 364/200 |
| 4,370,709 | 1/1983 | Fosdick | 364/200 |
| 4,396,982 | 8/1983 | Wada et al. | 364/200 |
| 4,402,042 | 9/1983 | Guttag | 364/200 |
| 4,415,969 | 11/1983 | Bayliss et al. | 364/200 |
| 4,422,144 | 12/1983 | Johnson et al. | 364/200 |
| 4,434,459 | 2/1984 | Holland et al. | 364/200 |
| 4,454,578 | 6/1984 | Matsumoto et al. | 364/200 |
| 4,471,433 | 9/1984 | Matsumoto et al. | 364/200 |
| 4,550,369 | 10/1985 | Rokutanda et al. | 364/200 |
| 4,554,627 | 11/1985 | Holland et al. | 364/200 |
| 4,574,344 | 3/1986 | Harris et al. | 364/200 |
| 4,616,313 | 10/1986 | Aoyagi | 395/375 |
| 4,631,663 | 12/1986 | Chilinski et al. | 364/200 |
| 4,631,672 | 12/1986 | Sakamoto | 364/200 |
| 4,633,390 | 12/1986 | Yoshida | 364/200 |
| 4,651,275 | 3/1987 | McDonough | 364/200 |
| 4,870,567 | 9/1989 | Kitamura et al. | 364/200 |
| 4,878,174 | 10/1989 | Watkins et al. | 364/200 |
| 4,897,787 | 1/1990 | Kawasaki et al. | 395/375 |
| 4,914,617 | 4/1990 | Putrino et al. | 364/786 |
| 4,916,652 | 4/1990 | Schwarz et al. | 395/375 |
| 4,954,943 | 9/1990 | Kawasaki et al. | 395/375 |
| 5,046,040 | 9/1991 | Miyoshi | 395/375 |
| 5,101,344 | 3/1992 | Bonet et al. | 395/375 |

FOREIGN PATENT DOCUMENTS 0279953 8/1988 European Pat. Off.

*Primary Examiner*—Thomas C. Lee
*Attorney, Agent, or Firm*—Eugene I. Shkurko; Maurice H. Klitzman; John D. Crane

[57] ABSTRACT

A mechanism translates a particular macroinstruction into its associated microprogram routine in a general purpose microprogrammed computer. The macroinstruction is capable of execution by either hardware or by microprogram. A table-look up approach is employed for a microprogrammed macroinstruction. The table is embedded in random-access-memory and contains entries representing the origins of various microprogram routines to execute the macroinstruction. The table entries are addressed by bits generated from the operation-code of the macroinstruction. The output of the table is used to address a single level control store containing the microprogram routines. Hardware is assembled in a single facility that is accessible by the microprogram routines to minimize the size of the microprogram routines required to execute the macroinstruction.

13 Claims, 4 Drawing Sheets

SYSTEM FOR EXECUTING MICROINSTRUCTION ROUTINES BY USING HARDWARE TO CALCULATE INITIALIZATION PARAMETERS REQUIRED THEREFORE BASED UPON PROCESSOR STATUS AND CONTROL PARAMETERS

This application is a continuation of U.S. application Ser. No. 07/774,131, filed Oct. 15, 1991, now abandoned, which is a continuation of U.S. application Ser. No. 07/287,430, filed Dec. 21, 1988, now abandoned.

FIELD OF THE INVENTION

This invention relates to digital computers. More specifically, the present invention relates to a mechanism in a microprogrammed computer for translating a macroinstruction into its associated microinstruction routines.

DESCRIPTION OF THE RELATED ART

LSI microprocessor design has reached the stage where new implementation techniques are required in order to control cost and increase life and flexibility. One technique for achieving these goals is to microprogram the instruction set used in controlling the processor. Microprogramming traditionally claims benefits of regularity (to decrease complexity), flexibility (to ease design changes), and reduced design cost.

Generally, a processor performs a series of operations upon digital information in an execution unit according to a stored program of instructions. These instructions are often termed "macroinstructions" in order to avoid confusion with the microinstructions contained in the control store of the processor. The microinstructions are often grouped into microinstruction routines in order to perform various macroinstructions. The grouped microinstruction routines constitute the microprogram of the processor.

Prior art processors use microprogrammed instructions to control internal circuitry in response to macroinstructions. These processors use table look-up approaches to map a macroinstruction into the appropriate microinstruction routines/microprogram. One prior art approach uses control store table entries consisting of microinstruction routines and blocks of micro-branches. The targets of the micro-branches are the first microinstruction of the microinstruction routines/microprogram. Each micro-branch is accessed by an address formed directly from the operation-code (op-code) of the macroinstruction. In addition, the micro-branch entries are physically remote from the processor in firmware, a ROM, to permit flexibility during the manufacturing process. One disadvantage of this approach is that entries in the remote table cannot be directly manipulated by the processor. This eliminates flexibility to make changes caused by development and later engineering changes. A second disadvantage results from the micro-branching process which requires extra operating cycles when the branching operations are executing. These extra cycles result in considerable delay between the time a processor work sequence is initiated by a macroinstruction and the decode of the first useful microinstruction of the microinstruction routine.

Another prior art processor uses microprogrammed storage divided into three sections. It is possible to execute macroinstructions of another processor using the three section memory to control the internal circuitry of the processor. One problem with this approach is the requirement of a multi-section memory which adds cost and complexity. Another drawback is that the processor is not capable of executing the same macroinstruction by either hardware or microprogram.

SUMMARY OF THE INVENTION

It is an object of the invention to translate a particular macroinstruction into the associated microinstruction routines in an improved manner.

It is another object of the invention to map a macroinstruction into its microinstructions routines by using a single table look-up approach.

It is yet another object of the invention to eliminate the delay between the initiation of a processor work sequence by a macroinstruction and the decode of the first microinstruction of the microinstruction routines.

It is still another object of the invention to service macroinstructions by hardware or microinstruction routines.

The foregoing and other objects, features, and advantages are accomplished by the mechanism disclosed herein. A processor accesses operation-code break out storage which has at least one instruction resolution table embedded in Random-Access-Memory (RAM). The table contains entries representing origins of various microinstruction routines. The table entries are accessible by the processor and are written during processor initialization. Specific bits of the macroinstruction operation-code are used to access the table entries. The contents of the table entry are assembled at the output of the resolution table and are used to address the first microinstruction of microinstruction routines/microprogram in a single level control storage array. Expansion of the number of macroinstructions capable of execution by the processor is achieved by adding additional resolution tables. Hardware setup of the macroinstruction information is in a single convenient facility, which is also accessible by the microinstructions, permitting hardware assembly of data and eliminating operations normally required through the execution of additional microinstructions.

DETAILED DESCRIPTION OF THE EMBODIMENTS

The invention provides a method of translating a macroinstruction into an associated micro-program routine where the instruction set consists of hardware executed instructions and microprogrammed instructions.

Figure 2:
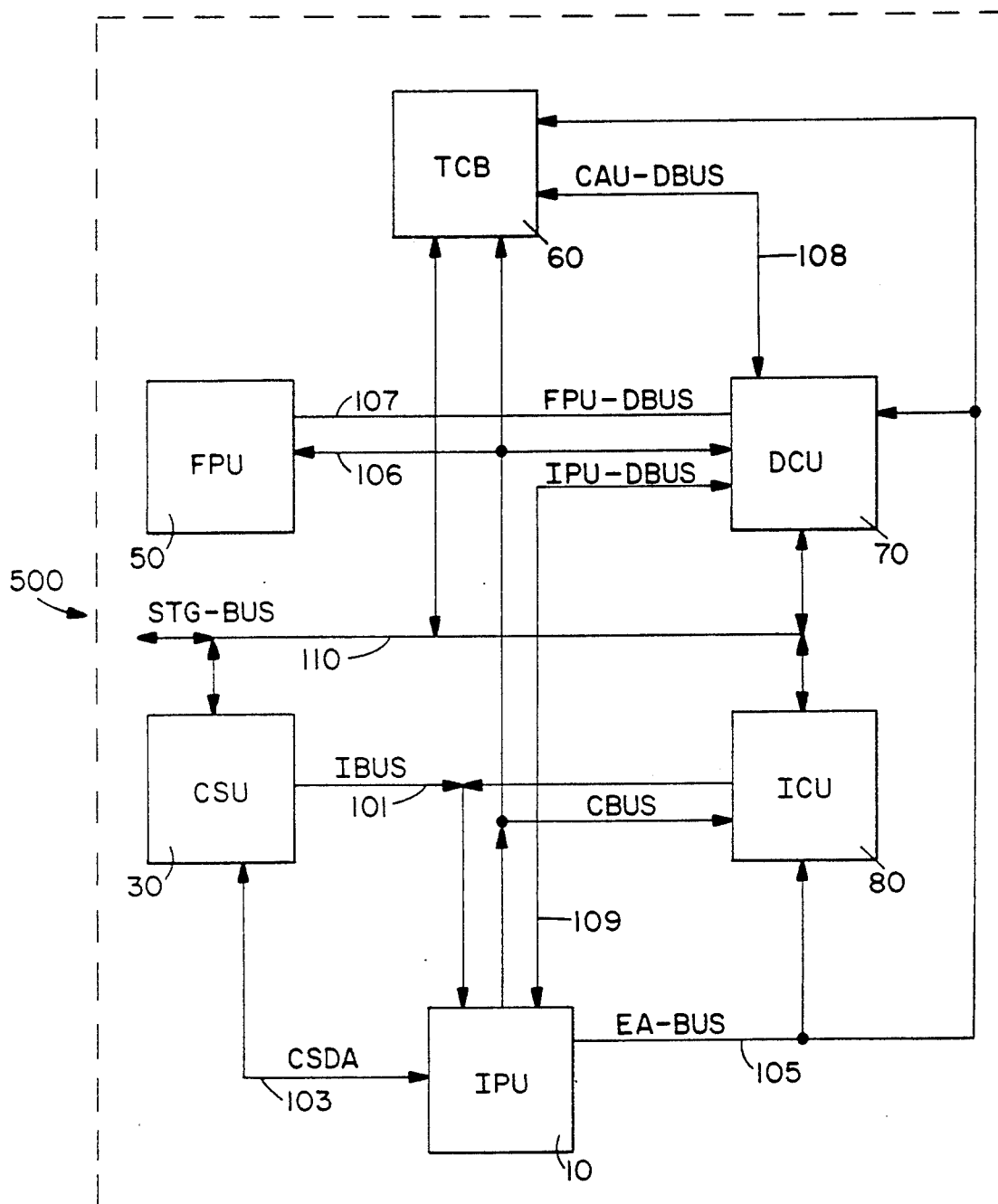
FIG. 2 is a block diagram representation of a typical digital computing system configuration for operations according to the invention.

FIG. 2 is a representation of a typical system which contains a processor and memory packaged on a single card, called the Processor Unit 500 or PU card. The Instruction Processing Unit (IPU) 10, Data Cache Unit (DCU) 70, Instruction Cache Unit (ICU) 80, L1 Memory Management Control (TLB) 60, Control Store Unit (CSU) 30, and Floating Point Unit (FPU) 50 all reside on the same card. Each of the units is packaged on a separate Multiple Chip Ceramic Modules (MCMs) with a maximum of four chips per Multiple Chip Ceramic Module. The units are interconnected by a number of data and control busses. The Storage Bus (STG-BUS) 110 is a bidirectional data/control interface between the Instruction Cache Unit 80, Control Store Unit 30, Data Cache Unit 70 and Memory Management Unit 60. In addition, this bus extends off the Processor Unit card to interface with main memory which is packaged on a separate card. Three bidirectional data busses, Cache Addressing Unit Bus (CAU DBus) 108, Floating Point Unit Data Bus (FPU DBus) 107, Instruction Processor Unit Data Bus 109 (IPU DBus) connect the Data Cache Unit 70 with the Memory Management Unit 60, the Floating Point Unit 50 and the Instruction Processor Unit 10, respectively. The Memory Management Unit 60 operates to provide communications between all of the units on the Processor Unit card. The Data Cache Unit 70 performs storage data fetches and stores. In addition, the Data Cache Unit 70 serves as a central data switch between the Instruction Processor Unit 10, Memory Management Unit 60 and the Floating Point Unit 50. The Command Bus (CBus) 106 is driven by the Instruction Processor Unit 10 and informs the other four units of requests to do operations initiated by the macroinstruction or microinstruction stream. In addition, the Command Bus 106 serves as a means for communicating to the other four units certain interrupting conditions (e.g., main memory commands to TLB/DCU/ICU); Input/Output actions, and any maintenance actions from outside the Processor Unit boundary. The Effective Address (EA) 105 Bus conveys operand and instruction addresses to the Memory Management Unit 60, Data Cache Unit 70 and Instruction Cache Unit 80. The Instruction Bus (IBus) 101 is a tri-state bus over which either the Instruction Cache Unit 80 or Control Store Unit 30 can drive instructions or microword to the Instruction Processor Unit 10. The Control Store Origin Address (CSOA) Bus 103 delivers new microwords stream control store addresses from the Instruction Processor Unit 10 to the Control Store Unit 30. In addition, the Control Store Origin Address Bus 103 exchanges control store addresses and controls between the two units for micro-branch and links (micro subroutine provisions).

Because of the packaging boundaries represented by each of the units, there is a considerable amount of interunit communication. Boundary latches required for interunit communications have resulted in delays requiring a full cycle. In some cases, bus transfers and control interface transitions require a full cycle for some intraunit activity. As a result, as much as three cycles of dead time may occur for some operations in which no useful execution occurs in the Instruction Processor Unit 10. One such operation where dead time occurs is the initial start-up of the micro-program from a macroinstruction. The initial micro-program start-up period is the time between the End-Operation (Endop) of the previous instruction and the decode cycle of the first microword of the next instruction's microprogram. Because of the dead time during microprogram start-up, a subset of the System/370 (S/370) instruction set was implemented without microprogramming. These microinstructions are executed completely in hardware. They are the most frequently used and simple instructions and are generally members of the S/370 General Instruction Set. In this way, a new instruction can be performed every cycle in the pipelined, specialized, fast/local Instruction Processor Unit 10 hardware without incurring dead time.

While it is possible to eliminate the dead time in a pure microprogram system by requiring an overlap between the microprogram start-up of one instruction with the actual microprogram execution of the previous instruction, the result of such a solution is increased complexity in the logic of the Control Store Unit 30 and Instruction Processor Unit 10 and a requirement for separate instruction buses from the Instruction Cache Unit 80 and Control Store Unit 30. Furthermore, an instruction buffer would be required that was resident in the Instruction Processor Unit 10 if the design deletes the Instruction Cache Unit 80 used in this invention. This instruction buffer would be used to supply an instruction stream from storage via the Data Cache Unit 10. The solution disclosed in this invention eliminates dead time in a microprogrammed Processor without the complexity of the aforementioned solutions and techniques shown in the prior art.

The Instruction Processor Unit 10 pipeline is viewed to begin with the decode cycle. The decode cycle triggers all subsequent pipelined states and operations. Preceding the decode cycle is the Instruction Bus 101 cycle (IBus) with either an Instruction-Valid (IVALID) or Control-Store-Valid (CSVALID) indication. The IPU 10 will not act on any decode cycles of instructions or microwords that are not preceded by one of these signals. The decode cycle of a macroinstruction begins the Operation-Code Break Out (OPBR) Process.

The first cycle of the OPBR process consists of: 1) determining whether to perform the macroinstruction in hardware or by microprogram execution, 2) creating the origin address of the microprogram in the Control Store Unit 30, and 3) appropriating hardware entities to setup or assist in carrying out the macroinstruction if it is to be done by microprogram.

The macroinstruction is decoded to detect all operation-codes that are microprogrammed instructions. Hardware controlled entities such as program-status-words (PSW), Control Register (CR) bits and Extended Architecture mode (XA) bits are combined with other decodes to conditionally microprogram certain macroinstructions or to add versatility to the Control Store Origin Address (CSOA) generation.

Figure 4:
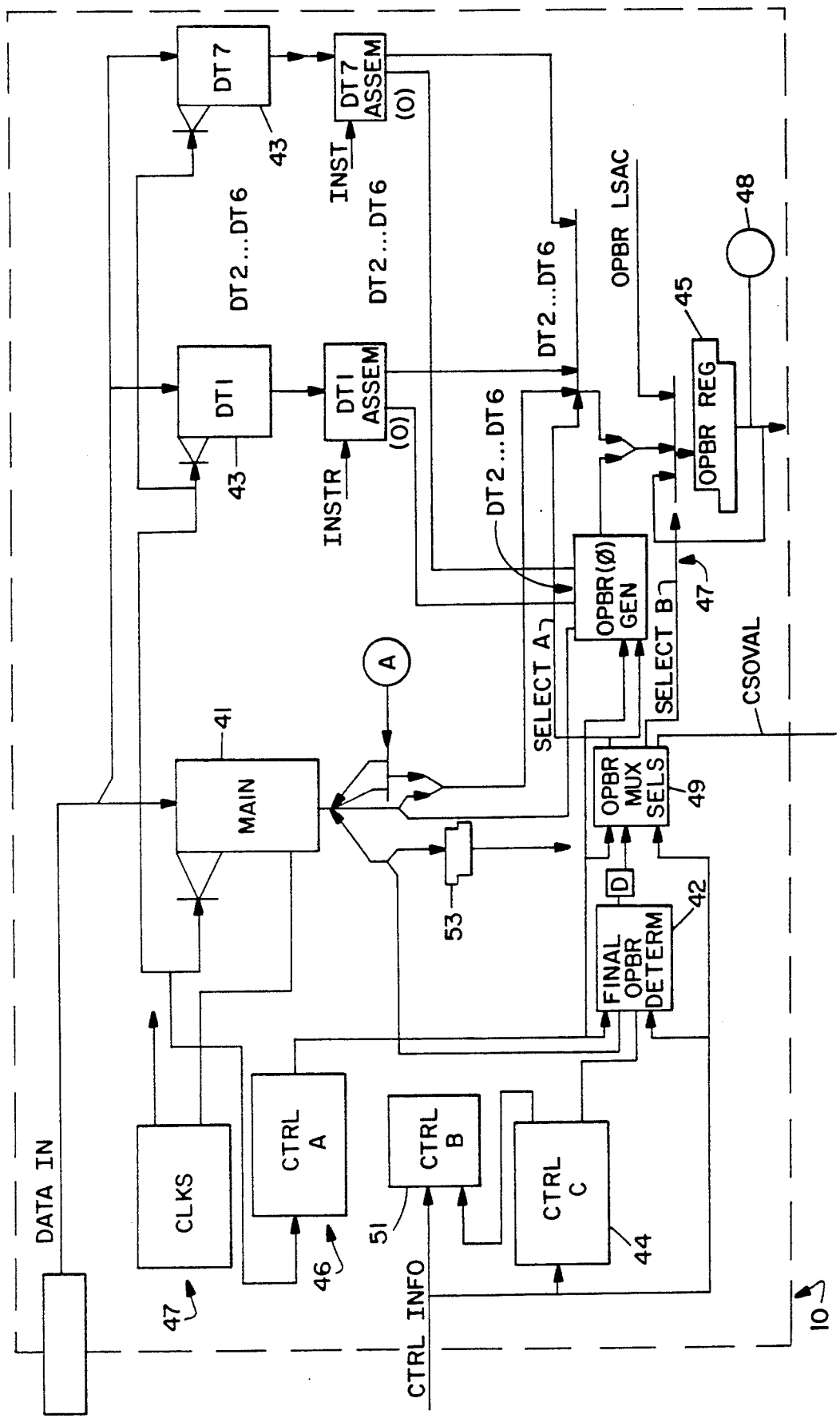
FIG. 4 illustrates resolution tables and logic located in the Instruction Processor Unit.

Turning now to FIG. 4, the local primary CSOA resolution table 41 is implemented using embedded Random Access Memory (RAM). The local primary table will be referred to as the Main OPBR table. The table is physically part of the IPU 10 logic shown in FIG. 2. The entries in this main table are addressed by using the Operation-Code (Op-code) of the System/370 (S/370) macroinstruction. The entries in the main table consist of four logical fields. The logical fields are:

1) The Valid (V) bit: When V=1, this bit provides the opportunity to microprogram an otherwise hardware implemented instruction.

2) Local Store Address Control (LSAC): LSAC bits are generated for each OPBR that occurs. New LSAC values are supplied to the LSAC Register (LSACR) to customize Local Store (LS) accesses for that microprogram. LSACR governs the manipulation of the operand specification (LSA) of each microinstruction to form the final Hardware LSA (HW LSA) for reading/writing the LS registers (i.e. direct, indirect, etc).

3) Control Store Address (CSA): One of two exclusively selectable 15-bit CSA's residing in the Main table 41 that specifies a complete CSOA as is (CS location for the beginning of the microprogram).

4) Alternate CSA (ALTCSA): A 6-bit field that can be selected to replace the bits residing in the low order 6 bits of the CSA to provide a CSOA that is up to 64 microwords away from the basic CSA-CSOA (i.e. a separate microprogram for a different flavor of the same instruction).

Additional resolution tables may be added to increase the number of microprogrammed instructions. The additional tables are designated Detail Resolution Tables 43 (DT) and any number may be added per the user's requirement, in addition, to the Main OPBR 41 table. The entries in the DT array 43 have the following format:

1) Partial Control Store Address (PCSA): 12 bits that form the most significant part of a DT-CSOA.

2) Detail Table Control bit: Controls CSOA generation from the PCSA and is generated by the microprogram linker. This bit governs the offset of the generated CSA by a predetermined amount and provides additional flexibility in the microprogram entry.

Entries in the Main OPBR 41 and Detail Tables (DT) 43 are written during initialization. The tables are only read thereafter during normal machine operation. However, since they are implemented in RAM, they are easily alterable for new microprogram loads if CSOA changes are required.

The S/370 Complex Instruction Set Computer (CISC) has an instruction set composed of general and extended operation-code group instructions. The extended Op-code group instruction consists of complex control instructions, operating system assist instructions and Vector Processor instructions.

Figure 1:
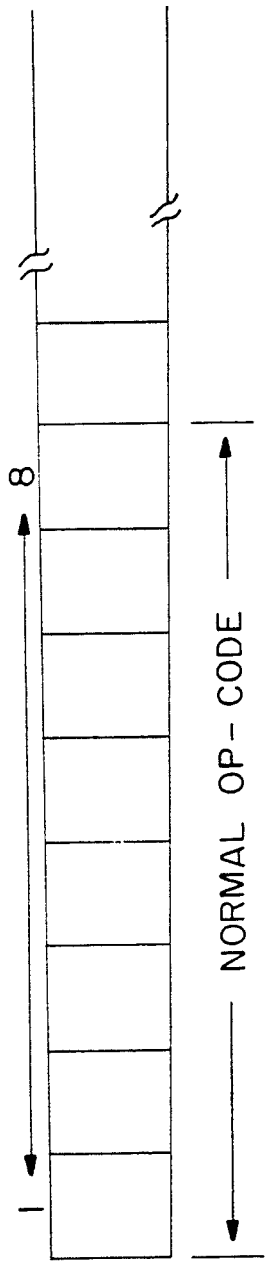
FIG. 1 illustrates the general format of a System/370 operation-code.
Figure 1:
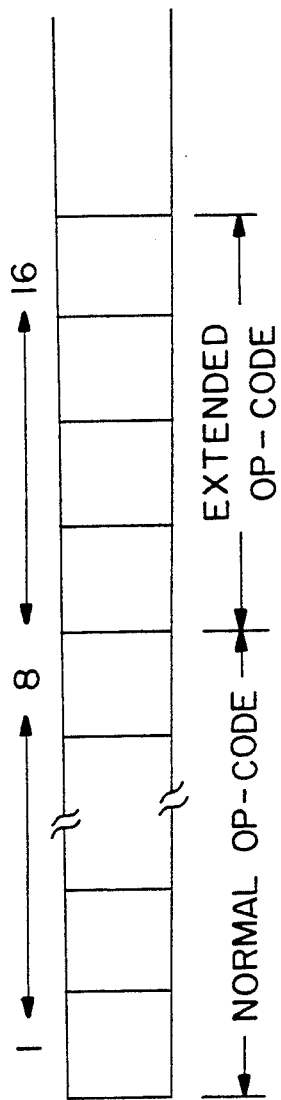

The extended operation-code of the instructions in each group is used to address the entries in the resolution tables 41, 43. Turning to FIG. 1, the first eight instruction bits of instructions in either group are designated the normal Op-code. Therefore, in normal operation, 256 possible entries can be addressed in the resolution table, representing 256 different instructions. In addition to the normal Op-code bits, extended Op-code instructions have eight additional bits. Thus, the first 16 bits of extended Op-code instructions are available for addressing resolution tables. When extended Op-code instructions are executed, the normal part of the Op-code is used to select the corresponding DT. Returning to FIG. 4, loading the contents of the selected DT 43 into a staging register will prohibit the loading of any other DT outputs or the Main OPBR table 41 output into the same staging register. The eight resolution tables 41, 43 are all implemented in RAM and are alterable by maintenance activities. These maintenance activities are part of a maintenance subsystem included in the Processor's total logic. The maintenance subsystem consists of logic and microprograms which perform functions associated with such things as diagnostics, initialization of hardware and overall machine serviceability.

Figure 3:
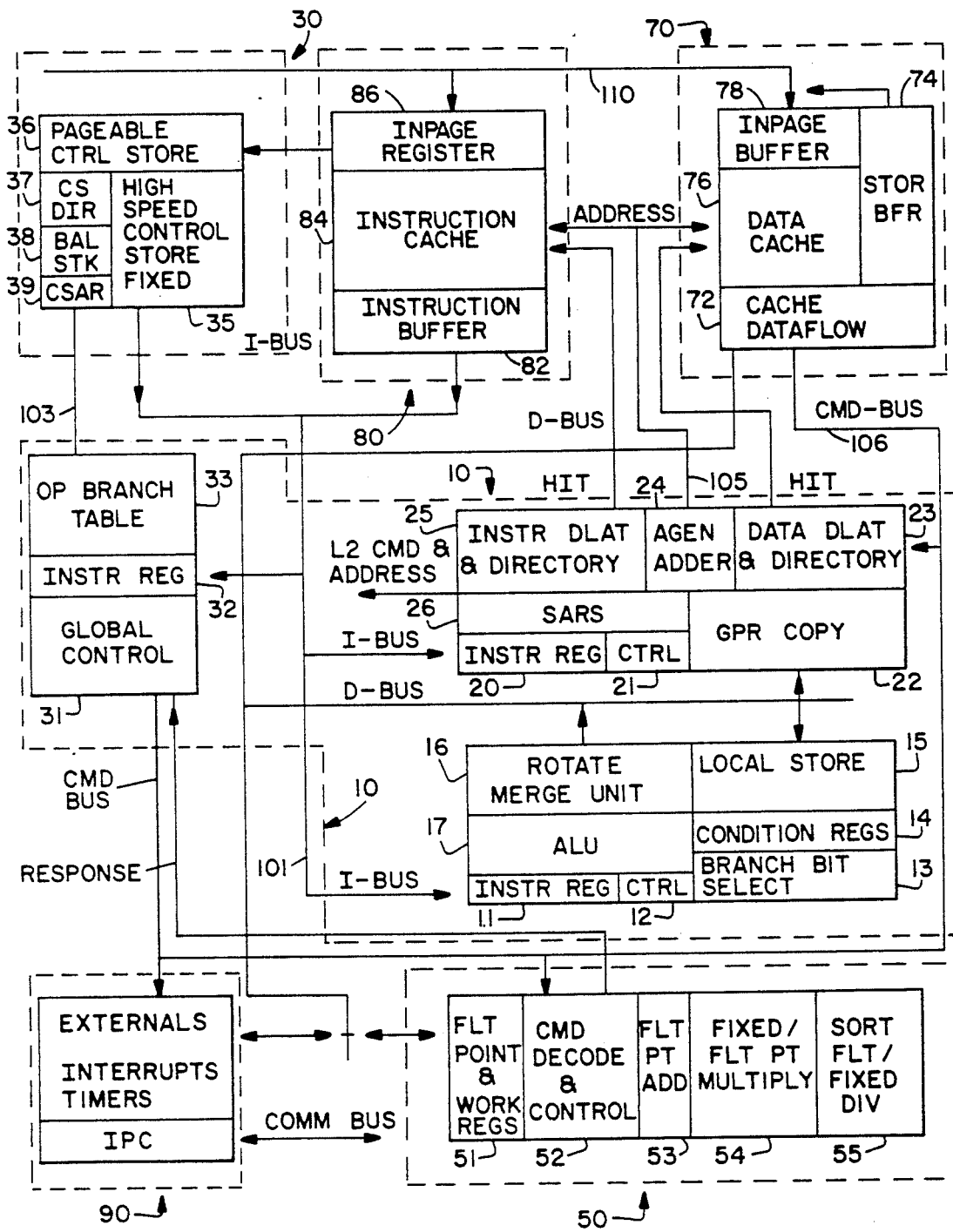
FIG. 3 illustrates a detailed description of the processor, Control Storage Unit, Instruction Cache Unit and Data Cache Unit.

Turning now to FIG. 3, greater details of the preferred embodiment are shown. The Instruction Processor Unit 10 is shown connected to its corresponding cache. It should be noted that the Instruction Processor Unit 10 may be termed the "Processor" or "Instruction/Execution Unit", but for the sake of simplicity in the description below, the block will be called the Instruction Processor Unit 10. In addition, the Instruction Cache Unit 80 and the Data Cache Unit 70 can be called the cache. The Control Store Unit 30 comprises a high speed fixed control store 35, a pageable area 36, a directory for the pageable Control Store 37, a Control Store Address Register (CSAR) 39, and a Branch and Link (BAL STK) facility 38. Machine state controls include the global controls 31 for the Processor, an OP-branch break out table 33 connected to the Control Store Address Register 39 via the Control Store Origin Address Bus 103 and used to generate the initial address for microcoded instructions. The address generation unit consists of an Instruction Cache DLAT and directory 25, a Data Cache DLAT and directory 23, and an address generation chip 24 connected to the cache via the address bus 105. The instruction DLAT 25 is connected to the Instruction Cache 84 portion of the cache via four "hit" lines which indicate that the requested instruction will be found in the instruction cache portion of the cache. Likewise, four "hit" lines connect the data DLAT 23 and directory indicating that the requested data will be found in the Data Cache portion 76 of the cache. The address generation unit 24 contains copies of the General Purpose Registers used to generate addresses and includes three storage address registers (SARs) 26, used to provide addresses to the microcode for instruction execution. The Instruction Processor Unit 10 is connected to the Data Cache Unit 70 and contains a Local Store array 15 which contains the General Purpose Registers (GPR) mentioned above and a number of working registers used exclusively by the microcode.

Condition registers 14 contain the results of a number of arithmetic and shift type operations and contain the results of a S/370 condition code; an Arithmetic Logic Unit (ALU) 17; a Rotate Merge Unit 16; Branch Bit Select hardware 13 which allows the selection of bits from various registers which determine the direction of a branch operation, the bits being selected from General Purpose Registers 15, Working registers, and the Condition Registers. A Floating Point Processor 50 includes floating point registers and four microcode working registers 51, a command decode and control function 52, a floating point adder 53, a fixed point and floating point multiply array 54, and a square-root and divide facility 55. The Floating Point Processor 50 is disclosed in U.S. Pat. No. 4,916,652, issued on Apr. 10, 1990, entitled "Dynamic Multiple Instruction Stream Multiple Data Multiple Pipeline Apparatus for Floating Point Single Instruction Stream Single Data Architectures", filed on Sep. 30, 1987, the disclosure of which is incorporated by reference into the specification of this application. The ALU 17 contains an adder, the adder being disclosed in U.S. Pat. No. 4,914,617, issued on Apr. 3, 1990, filed Jun. 26, 1987, entitled "A High Performance Parallel Binary Byte Adder", the disclosure of which is incorporated by reference into the specification of this application. An externals chip 90 includes timers and interrupt structure, the interrupts being provided from the I/O subsystem 14, and others.

Continuing with FIG. 3, the cache comprises the following elements: an Instruction Cache 84, an instruction buffer 82 at the output thereof, and an inpage register 86 connected to the CSU 30. The storage bus 110 is connected to the instruction cache unit 80, being connected to the inpage register 86. The inpage register 86 is connected to the control store unit 30 and provides data to the unit in the event of a pageable control store miss and new data must be brought into the control store 30. The data cache 70 comprises an inpage buffer 78 also connected to the storage bus 110; a data cache 76; a cache dataflow 72 which comprises a series of input and output registers and which is connected to the Instruction Processor Unit 10; and store buffer (STOR BFR) 74.

A description of the functional operation of the processor and cache shown in FIG. 3 will be provided in the following paragraphs with reference to FIG. 3 of the drawings. The first operation described is a pure hardware execution of a macroinstruction. This operation may also be referred to as "hardwired" or hardware macroinstruction execution mode.

Assume that a macroinstruction to be executed is located in the instruction cache 84. The instruction is fetched from the instruction cache 84 and is stored in the instruction buffer 82 (every attempt is made to keep the instruction buffer full at all times). The instruction is fetched from the instruction buffer 82 and is stored in the instruction registers of the address generation chip 20, the ALU 17 and Rotate Merge Chip 16, and the machine state controls 32, at which point, the instruction decoding begins. Operands are fetched from the GPR COPY 22 in the address generation unit 24 if an operand is required (normally, GPR COPY is accessed if operands are required for the base and index registers for an RX instruction). In the next cycle, the address generation process begins. The base and index register contents are added to a displacement field of the instruction, and the effective address is generated and sent to the data cache 70 and/or the instruction cache 80. In this example, an operand is sought. Therefore, the effective address will be sent to the Data Cache 70. The address is also sent to the data DLAT and directory chip 23 (since, in this example, an operand is sought). Access to the cache and the directories will begin in the third cycle. The DLAT 23 will determine if the address is translatable from an effective address to an absolute address. Assuming that this translation has been previously performed, we will have recorded the translation. The translated address is compared with the output of the cache directory 23. Assuming that the data has previously been fetched into the cache 76, the directory output and the DLAT output are compared; if they compare equal, one of the four "hit" lines are generated from the data DLAT and directory 23. The hit lines are connected to the Data Cache 76; a generated "hit" line will indicate which of the four associativity classes contains the data that we wish to retrieve. On the next cycle, the data cache 76 output is gated through a fetch alignment shifter in the cache dataflow 72. The data is transmitted to the IPU 10, and is latched into the ALU 17. This will be the access of operand 2 of an RX type of instruction. In parallel with this shifting process, operand 1 is accessed from the General Purpose Registers in Local Store 15. As a result, two operands are latched in the input of the ALU 17, if necessary. In the fifth cycle, the ALU 17 will process (add, subtract, divide, etc.) the two operands accordingly, as dictated by the macroinstruction's op-code. The output of the ALU 17 is latched and the condition registers 14 are latched, at the end of the fifth cycle, to indicate an overflow or zero condition. In the sixth cycle, the output of the ALU 17 is written back into the local store 15 and into the GPR copy 22 of the address generation unit 24 in order to keep the GPR copy 22 in sync with the content of the local store 15. When the decode cycle of this instruction is complete, the decode cycle of the next instruction may begin, so that there will be up to six macroinstructions in either decoding or execution at any one time.

Using FIGS. 2-4, an operation will now be described for a macroinstruction executed using microprogramming. During the decode cycle, the OP-branch table 33 is searched, using the Op-code from the instruction as an address, the OP-branch table 33 provides the beginning address of the microinstruction routines needed to execute the instruction.

Cycle 1 of the IPU 10 pipeline is viewed to begin with the decode cycle which triggers all subsequent pipeline states and operations. The decoded bits of the macroinstruction are modified with architecture control entries such as the PSW, XA Mode bit, and CR bits before they are driven to the resolution tables. Turning briefly to FIG. 4, the decoded bits are driven to the resolution tables 41, 43. Selection and multiplexing of one of the CSA's, ALTCSA or one of four variations of DT1-DT7 results in a final Control Store Origin Address (CSOA). The output of the Main Table 41 or one of DT1-DT7 43 is latched into a staging register, called the OPBR register 45 in FIG. 4. During cycle 1, the LSAC for the current instructions is also latched at the output of the Main Table 41 into the OPBR LSAC 53 register. The Main Table LSAC is used for every OPBR, even during extended Op-code instructions when the Main table's ALTCSA/CSA fields are not used Returning to FIG. 3, macroinstructions executed using microprogramming require more than one cycle to execute. Therefore, instruction decoding is suspended while the OP-branch table is being accessed. In the case of microprogramming, the IBUS 101 is utilized to provide microinstructions to the decoding hardware. The instruction cache 84 is shut-off, the control store 35 is turned-on, and the microinstructions are passed over the IBUS.

For Floating Point Instructions, decoding proceeds as previously described, except that, during the address generation cycle, a command is sent to the Floating Point Unit 50 to indicate and identify the proper operation to perform. In an RX Floating Point Instruction, for example, an operand is fetched from the Data Cache 76, as described above, and the operand is transmitted to the Floating Point Processor 50 in lieu of the IPU 10. Execution of the Floating Point Instruction is commenced. When complete, the results of the execution are returned to the IPU 10, the "results" being a condition code, and any interrupt conditions, such as overflow.

During cycle 2, the contents of the OPBR register 45 are multiplexed onto the CSOA 103 Bus. The CSU 30 receives the contents of the CSOA bus and latches it into the CSAR 39 register. Cycle 2 is completed in the IPU 10 by loading the IPU's copy of the CSAR from the OPBR 45 register and then loading bits 12-17 of the OPBR 45 register from the OPBR LSAC 53 register.

Cycle 3 is occupied by two main activities and represents the end of the OPBR process. The first activity occurs in the CSU 30 where the contents of the CSAR 39 are used to access the CS array 35. The microinstruction stored at the accessed location is assembled from bit-sliced portions across 6 CS chips, and is sent to the IPU 10. The second activity consists of a concurrent operation in the IPU 10, where the IPU 10 sends the OPBR LSAC 53 contents latched in the OPBR register 45 to the CSU 30 over the CSOA 103 bus. This operation ends the OPBR process and the IPU card 10 is now in normal micromode. In normal micromode, the CSU 30 can perform one of two possible operations. The first may consist of accessing and driving a microinstruction while latching the incremented CSAR 39 that points to the next sequential microinstruction. The second operation may be a response to one of the interface commands, such as "hold", "branch", or "return". The IPU remains in micromode until an Endop microinstruction is encountered.

Cycle 4 begins the decode of the first microword in the microprogram. Since the micro-architecture is a reduced instruction set (RIS) type, the execution of each microword resembles either RR type, load type, or store type instructions of the S/370 architecture. Each of these microwords is executed in three to four cycles (stages) with the decode of the microword as cycle one of the microword execution. Depending on the microword in execution, cycle two of the microword is used to generate storage address and storage request in the case of load or store microword, or cycle two is the execution cycle in the case of RR microword. Cycle three of the microword is the MMU 60/Data Cache Unit 70 access in the case of the load or store type or the GPR 22/LS 15 updates with the temporary (with respect to the macroinstruction) execution result in the case of the RR type. The microprogram execution is performed in a pipeline fashion with the start of a new microword in every cycle. This pipeline execution continues until the decode of the last microinstruction or Endop in the microprogram.

The complementary operation of the ICU 80 and CSU 30 is possible because of certain controls that allow interpretation and execution of both instructions and microwords. These controls include the Hardware Mode (HW MODE) signal, Use Alternate Instruction Register (USE AIR) signal, and Degate CSU/ICU signal. The HW MODE governs the interpretation of the effective instruction. The active state of the signal indicates that an instruction in the Instruction Register 11 or the Alternate Instruction Register 20 (AIR) is a macroinstruction and should be treated in a special manner (e.g. with respect to decode, instruction format, architectural facilities available for operation). All instructions are required to have HWMODE=1 for proper operation of the decode cycle. This includes instructions that are to be executed by microprogram. The HW MODE signal also operates to perform a different function during processor setup or initialization. With HW MODE=1, each instruction that passes through the decode cycle loads setup information which consist primarily of latches and registers. If microprogrammed instructions are detected, the setup values are retained by switching HW MODE to 0 during cycle 2. Only specific microwords can alter these values while the processor is in micromode. A FIFO stack is maintained for HW MODE states for handling responses from other units and interrupts resulting from execution of microinstructions in a deep pipeline processor. HW MODE is set when a microinstruction routine is completed by the decode or execution of an Endop microword.

A second important control is the USE AIR signal. The IPU 10 contains two registers, IR 11 and AIR 20, which latches macroinstructions and microinstructions. The decodes of these registers signify and enable the beginning of processor execution. The outputs of the two registers are exclusively multiplexed to provide a single set of instruction information/data to the IPU logic. The latch set by USE AIR, controls the multiplexer so that when activated, AIR 20 is gated to the output and when deactivated IR 11 is selected. Normal instructions (HW MODE=1) are then fed to the IPU 10 through IR 11 while all micro streams (HWMODE=0) use AIR 20. This signal also serves the performance function of keeping the instruction that follows a microcoded instruction saved in the IPU 10 when in micromode. The latched USE AIR signal, is applied to hold the present value of IR 11 such that the last instruction sent by ICU 80, which is the next sequential instruction, is captured. This permits the IPU 10 to decode the next instruction directly after executing the Endop microword cycle. To perform this function, USE AIR must be activated during the decode cycle of the microcoded instruction while the next sequential instruction is driven on the IBUS 101. This requirement may be met by providing any two registers and need not be dedicated full time instruction registers. Without this provision, every microcoded instruction would incur 1 to 3 dead cycles in the IPU 10, since the ICU 80 would have to redrive the next instruction.

A third significant control is the Degate ICU/CSU signals. The output of latched Degate ICU is used by ICU 80 in its active state to disable its IBus 101 and place the drivers in a high impedance state. Conversely, the opposite level of the signal enables ICU 80 to drive the bus. The signal causes ICU 80 to hold the current instruction thus allowing the ICU 80 to send the second macroinstruction after the prior macroinstruction when the microinstruction routine is finished and the signal is released. Degate CSU is used the same way in the CSU 30. The two signals are mutually exclusive and if simultaneously driven causes both ICU 80 and CSU 30 to both drive the IBus 101 with possible catastrophic results.

Finally, certain IPU 10 setup functions are performed in hardware eliminating the need for additional microcode. Of the two possibilities now possible, accessing a facility without saving or accessing and saving, the latter is preferred. This invention assembles all the items needed for a microprogram into an easily accessible register set at the beginning of the microprogram. This is all done in hardware thus eliminating the need for extra microcode to perform the function. These items include: Storage Address Registers 26 (SARs) which are calculated storage addresses of one of the operand locations of the instruction; LENs, which give the length in bytes of the associated data/locations in storage for the operand used in storage to storage instructions; arithmetic constants from various fields in the instruction; the General Register (GR) operand address fields; and LEXT, a multitude of system and architectural status and control parameters, organized into a local external mapping and access scheme. The process of establishing the proper values for each item occurs during Instruction setup. The values are held after being established by switching the HW MODE to zero. After being set, the values are available for direct and implicit access by certain microwords, including alteration as a result of a microword.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A computer for processing macroinstructions, said computer comprising:
   macroinstruction storage means for storing said macroinstructions;
   microinstruction storage means for storing a plurality of microinstruction routines; and
   processor means, said processor means comprising:
      receiving means for receiving a macroinstruction from said macroinstruction storage means;
      a resolution table memory having stored therein a plurality of entries, each of said entries comprising a starting address of one of said plurality of microinstruction routines;
      addressing means, responsive to the received macroinstruction in said receiving means, for addressing said resolution table memory and causing it to supply to said microinstruction storage means the starting address of a microinstruction routine associated with said received macroinstruction;
      register means containing processor status and control parameters for sending data signals representing said processor status and control parameters;
      hardware, in response to said data signals representing said processor status and control parameters supplied by said register means and said received macroinstruction, for calculating setup and initialization parameters required for the execution of said microinstruction routine associated with said received macroinstruction; and
      execution means connected to said microinstruction storage means and responsive to said setup and initialization parameters for executing said microinstruction routine associated with said received macroinstruction.

2. A computer, as in claim 1, wherein said hardware comprises storage registers whose contents are altered by said execution means during the execution of said microinstruction routine associated with said received macroinstruction and used by said execution means as data during the execution of subsequent microinstructions within said microinstruction routine associated with said received macroinstruction.

3. A computer, as in claim 1, wherein said calculation of said setup and initialization parameters by said hardware occurs in parallel with said addressing means supply to said microinstruction storage means of the starting address of a microinstruction routine associated with said received macroinstruction.

4. A computer, as in claim 1, wherein said macroinstructions each comprise an operation code segment and said addressing means is responsive to said operation code segment of said received macroinstruction for addressing said resolution table memory and causing it to supply to said microinstruction storage means the starting address of a microinstruction routine associated with said received macroinstruction.

5. A computer, as in claim 4, wherein said macroinstructions each comprise an operation code segment and operands and wherein said setup and initialization parameters calculated by said hardware include a storage address for each of said operands.

6. A computer, as in claim 1, wherein said macroinstructions each comprise a normal operation code segment and wherein said resolution table memory contains detail resolution tables and said detail resolution tables have stored therein a plurality of entries, each of said entries comprising the starting address of one of said plurality of microinstruction routines, and said addressing means utilizes said normal operation code segment of said received macroinstruction to determine which one of said detail resolution tables contains the starting address of a microinstruction routine associated with said received macroinstruction.

7. A computer, as in claim 6, wherein said macroinstructions each comprise a normal operation code segment and an extended operation code segment and wherein said addressing means is responsive to said extended operation code segment of said received macroinstruction in addressing said one of said detail resolution tables.

8. A computer for processing macroinstructions, said computer comprising:
   macroinstruction storage means for storing said macroinstructions wherein said macroinstructions each comprise operands;
   microinstruction storage means for storing a plurality of microinstruction routines; and
   processor means, said processor means comprising:
      receiving means for receiving a macroinstruction from said macroinstruction storage means;
      a resolution table memory having stored therein a plurality of entries, each of said entries comprising a starting address of one of said plurality of microinstruction routines;
      addressing means, responsive to the received macroinstruction in said receiving means, for addressing said resolution table memory and causing it to supply to said microinstruction storage means the starting address of a microinstruction routine associated with said received macroinstruction;
      register means containing processor status and control
      hardware responsive to said processor status and control parameters and said received macroinstruction for calculating setup and initialization parameters required for the execution of said microinstruction routine associated with said received macroinstruction, said setup and initialization parameters comprising storage addresses of said operands and byte lengths of said operands;
      execution means connected to said receiving means and said microinstruction storage means, the execution means responsive to said setup and initialization parameters when execution said microinstruction routine associated with said received macroinstruction, and responsive to said received macroinstruction when executing said received macroinstruction directly without use of the hardware; and
      control means, responsive to said received macroinstruction, for determining whether to execute said received macroinstruction directly in said execution means or to execute the microinstruction routine associated with said received macroinstruction.

9. A computer, as in claim 8, wherein said hardware comprises storage registers whose contents are altered by said execution means during the execution of said microinstruction routine associated with said received macroinstruction and used by said execution means as data during the execution of subsequent microinstructions within said microinstruction routine associated with said received macroinstruction.

10. A computer, as in claim 8, wherein said macroinstructions each comprise an operation code segment and said addressing means is responsive to said operation code segment of said received macroinstruction for addressing said resolution table memory and causing it to supply to said microinstruction storage means the starting address of a microinstruction routine associated with said received macroinstruction.

11. A computer, as in claim 10, wherein said setup and initialization parameters calculated by said hardware include a storage address for each of said operands.

12. A computer, as in claim 8, wherein said macroinstructions each comprise a normal operation code segment and an extended operation code segment, and wherein said resolution table memory contains detail resolution tables and said detail resolution tables have stored therein a plurality of entries, each of said entries comprising the starting address of one of said plurality of microinstruction routines, and said addressing means utilizes said normal operation code segment of said macroinstructions to determine which one of said detail resolution tables contains the starting address of one of said plurality of microinstruction routines associated with said received macroinstruction.

13. A computer, as in claim 12, wherein said addressing means is responsive to said extended operation code segment of said received macroinstruction in addressing said one of said detail resolution tables.

* * * * *